(12) United States Patent
Yang et al.

(10) Patent No.: US 10,883,154 B2
(45) Date of Patent: Jan. 5, 2021

(54) CRANKSHAFT AND METHOD OF MANUFACTURE

(71) Applicant: GM Global Technology Operations LLC, Detroit, MI (US)

(72) Inventors: Jianghuai Yang, Rochester Hills, MI (US); James D. Cremonesi, Rochester Hills, MI (US); Paul J. Gelazin, Clarkston, MI (US); Qigui Wang, Rochester Hills, MI (US); Daniel J. Wilson, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 99 days.

(21) Appl. No.: 16/056,990

(22) Filed: Aug. 7, 2018

(65) Prior Publication Data

US 2020/0048727 A1 Feb. 13, 2020

(51) Int. Cl.
| | | |
|---|---|---|
| *C21D 9/30* | (2006.01) | |
| *F16C 3/08* | (2006.01) | |
| *C21D 1/18* | (2006.01) | |
| *C21D 1/58* | (2006.01) | |
| *C22C 38/00* | (2006.01) | |

(52) U.S. Cl.
CPC ............... *C21D 9/30* (2013.01); *C21D 1/18* (2013.01); *C21D 1/58* (2013.01); *C22C 38/00* (2013.01); *F16C 3/08* (2013.01); *C21D 2211/005* (2013.01); *C21D 2211/008* (2013.01); *F16C 2204/62* (2013.01); *F16C 2204/64* (2013.01); *F16C 2223/10* (2013.01); *Y10T 29/49286* (2015.01)

(58) Field of Classification Search
CPC ....... C21D 9/30; C21D 1/185; Y10T 29/49286
See application file for complete search history.

(56) References Cited

U.S. PATENT DOCUMENTS

| | | | | |
|---|---|---|---|---|
| 1,924,296 A | * | 8/1933 | Stoffel | C21D 9/30 148/642 |
| 4,032,368 A | * | 6/1977 | Grange | C21D 1/185 148/503 |
| 4,062,700 A | * | 12/1977 | Hayami | C21D 8/0226 148/602 |
| 4,067,756 A | * | 1/1978 | Koo | C21D 1/185 148/320 |
| 4,159,218 A | * | 6/1979 | Chatfield | C21D 1/185 148/333 |

(Continued)

OTHER PUBLICATIONS

Kirklady, Quantitative Prediction of Transformation Hardening in Steels, 1991, ASM International, ASM Handbook, vol. 4: Heat Treating, pp. 20-32 (Year: 1991).*

(Continued)

*Primary Examiner* — Jason L Vaughan

(57) ABSTRACT

A method for manufacturing a crankshaft for an internal combustion engine with a plurality of journals having a hardened case with a first microstructure. The crankshaft is comprised of a steel comprising between about 0.3 wt % and 0.77 wt % Carbon. The first microstructure of the hardened case of the journals comprises between about 15% and 30% ferrite and a balance of martensite and the resultant subsurface residual stress between 310 MPa and 620 MPa.

6 Claims, 4 Drawing Sheets

(56) References Cited

U.S. PATENT DOCUMENTS

| | | | | |
|---|---|---|---|---|
| 4,196,025 A * | 4/1980 | Davies | ............... | C21D 1/185 |
| | | | | 148/334 |
| 4,222,796 A * | 9/1980 | Davies | ............... | C21D 1/185 |
| | | | | 148/334 |
| 4,230,506 A * | 10/1980 | Clark | ............... | C21D 5/00 |
| | | | | 148/321 |
| 4,619,714 A * | 10/1986 | Thomas | ............... | C21D 8/0226 |
| | | | | 148/599 |
| 4,880,477 A * | 11/1989 | Hayes | ............... | C21D 1/20 |
| | | | | 148/545 |
| 5,028,281 A * | 7/1991 | Hayes | ............... | C21D 1/20 |
| | | | | 148/321 |
| 5,451,749 A * | 9/1995 | Griebel | ............... | H05B 6/101 |
| | | | | 148/572 |
| 5,906,691 A * | 5/1999 | Burnett | ............... | C21D 1/10 |
| | | | | 148/320 |
| 7,566,373 B2 * | 7/2009 | Takayama | ............... | C21D 1/10 |
| | | | | 148/572 |
| 9,239,075 B2 * | 1/2016 | Kim | ............... | C21D 9/30 |
| 9,869,009 B2 * | 1/2018 | Vartanov | ............... | C22C 38/50 |
| 10,138,528 B2 * | 11/2018 | Gabilondo | ............... | B23K 26/082 |
| 2008/0229877 A1 * | 9/2008 | Iwasaki | ............... | F16C 3/08 |
| | | | | 74/595 |
| 2015/0074998 A1 * | 3/2015 | Maldaner | ............... | C21D 7/00 |
| | | | | 29/888.08 |
| 2017/0044635 A1 * | 2/2017 | Sourmail | ............... | C21D 7/13 |
| 2018/0155804 A1 * | 6/2018 | Sancho D Az | ............... | C21D 1/09 |
| 2019/0143398 A1 * | 5/2019 | Hansen | ............... | B21H 7/185 |
| | | | | 29/888.08 |

OTHER PUBLICATIONS

Yong et al., Microstructure and Property Evolution of the 1538MV Non-Quenched and Tempered Steel for a Crankshaft during the Forging Process, Mar. 8, 2018, University of Science and Technology Bejing, School of Material Science and Technology, (Year: 2018).*

Bates et al., Quenching of Steel, 1991, ASM International, ASM Handbook, vol. 4: Heat Treating, pp. 67-120 (Year: 1991).*

Kuyack et al., Quench Time Measurement as a Process Control Tool, Part I, Heat Treating Progress, Jan. 2005 (Year: 2005).*

Reti et al., Prediction of as-quenched hardness after rapid austenitzzation and cooling of surface hardened steels, Computational Materials Science 15, 1999 (Year: 1999).*

Sandven, Laser Surface Hardening, 1991, ASM International, ASM Handbook, vol. 4: Heat Treating, pp. 286-296 (Year: 1991).*

* cited by examiner

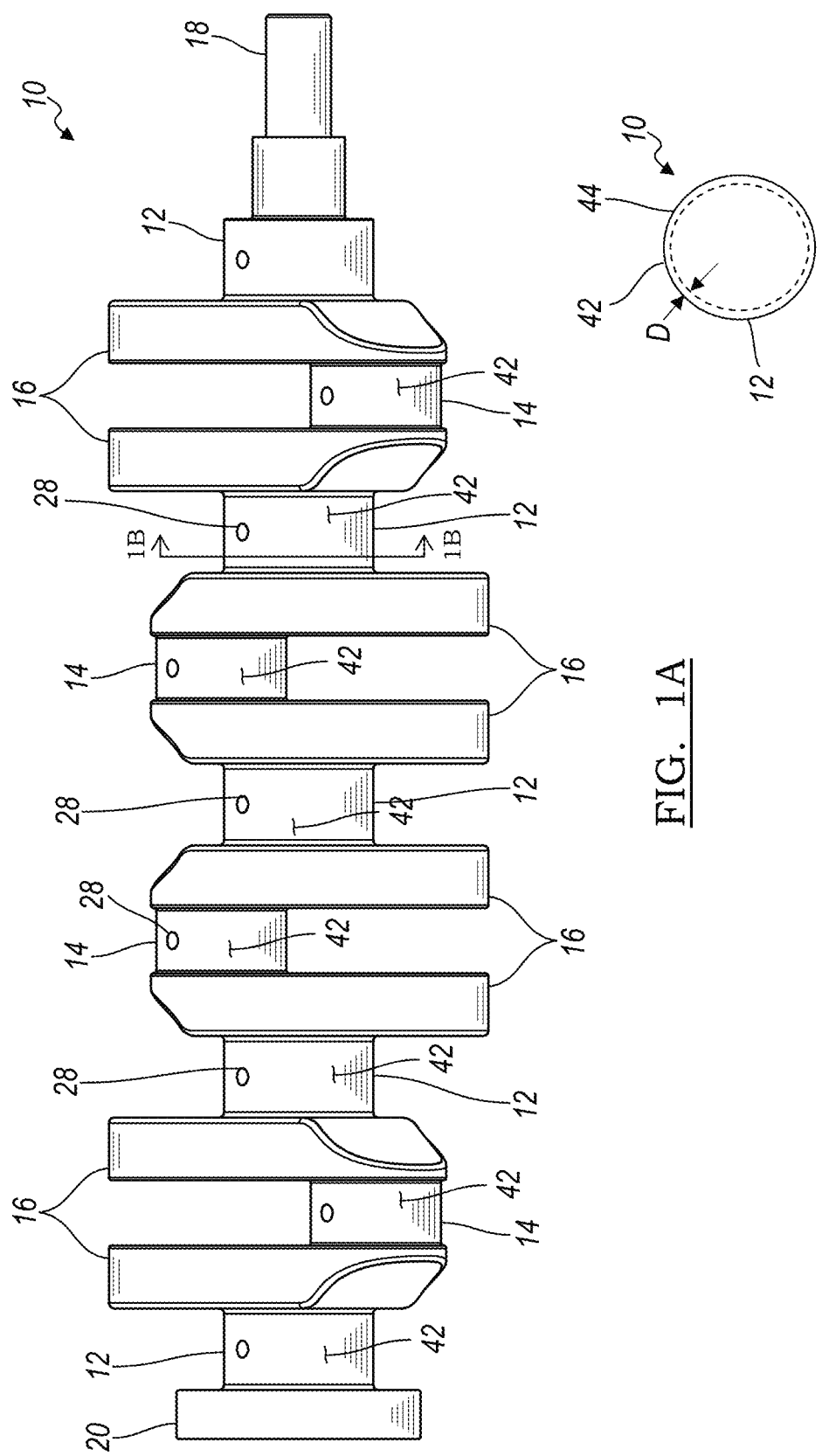

CRANKSHAFT AND METHOD OF MANUFACTURE

INTRODUCTION

The present disclosure relates generally to methods of manufacturing crankshaft for internal combustion engines and more particularly to hardening methods that provide hardened high wear surfaces with low subsurface residual stress.

Traditional methods of hardening medium carbon steel crankshafts include heating the journal surfaces such that microstructure results in 100% martensite upon quenching. The resultant residual stress in the crankshaft was excessive for the design of the crankshaft which were prone to fatigue crack failures; especially originating from the subsurface below the hardened journal case.

Accordingly, there is a need in the art for improved hardening methods that maintain surface hardness specifications while reducing the amount of residual stress remaining in the crankshaft.

SUMMARY

The present disclosure comprises a crankshaft for an internal combustion engine. The crankshaft includes a plurality of journals each having a surface and a hardened case. The crankshaft further includes a steel having up to about 0.77 wt % Carbon. The hardened case has a first microstructure comprising ferrite and martensite.

In an example of the present disclosure, the surface of the plurality of journals has a surface hardness between HRC 40 and 50.

In another example of the present disclosure, the first microstructure comprises up to 50% ferrite.

In yet another example of the present disclosure, the first microstructure comprises between about 15% and 30% ferrite.

In yet another example of the present disclosure, the steel comprises between 0.3 wt % and 0.77 wt % Carbon.

In yet another example of the present disclosure, the steel comprises 0.38 wt % Carbon.

In yet another example of the present disclosure, the crankshaft comprises residual stress between 310 MPa and 620 Mpa.

In yet another example of the present disclosure, the crankshaft comprises residual stress between about 400 MPa and 550 MPa.

The present disclosure further comprises a method for manufacturing a ferrous workpiece. The method includes providing a machined workpiece comprised of a steel comprising up to 0.77 wt % Carbon, and wherein the workpiece comprises a first journal having a surface, heating the surface of the first journal to an intercritical temperature, and quenching the surface of the first journal with a quench medium achieving a cooling rate between 15 to 20° C./sec.

In yet another example of the present disclosure, the method further comprises tempering the workpiece.

In yet another example of the present disclosure, providing a machined workpiece comprised of a steel comprising up to 0.77 wt % Carbon, and wherein the workpiece comprises a first journal having a surface further comprises providing a machined workpiece comprised of a steel comprising between 0.3 to 0.77 wt % Carbon.

In yet another example of the present disclosure, heating the surface of the first journal to an intercritical temperature further comprises heating the surface of the first journal to between about 724° C. and 820° C. and quenching the surface of the first journal with a quench medium achieving a cooling rate between 15 to 20° C./sec further comprises quenching the surface of the first journal with an oil or polymer solution.

In yet another example of the present disclosure, heating the surface of the first journal to an intercritical temperature further comprises heating the surface of the first journal to between about 724° C. and 760° C.

In yet another example of the present disclosure, providing a machined workpiece comprised of a steel comprising up to 0.77 wt % Carbon, and wherein the workpiece comprises a surface of the first journal further comprises providing a machined workpiece comprised of a steel comprising about 0.38 wt % Carbon.

In yet another example of the present disclosure, heating the surface of the first journal to an intercritical temperature further comprises heating the surface of the first journal to between about 724° C. and 822° C.

In yet another example of the present disclosure, heating the surface of the first journal to an intercritical temperature further comprises heating the surface of the first journal to between about 780° C. and 810° C.

The above features and advantages and other features and advantages of the present disclosure are readily apparent from the following detailed description when taken in connection with the accompanying drawings.

BRIEF DESCRIPTION OF THE DRAWINGS

The drawings described herein are for illustration purposes only and are not intended to limit the scope of the present disclosure in any way.

FIG. 1A is a view of a crankshaft for an internal combustion engine according to the principles of the present disclosure;

FIG. 1B is a cross section of a the crankshaft for an internal combustion engine according to the principles of the present disclosure;

DESCRIPTION

Figure 2A:
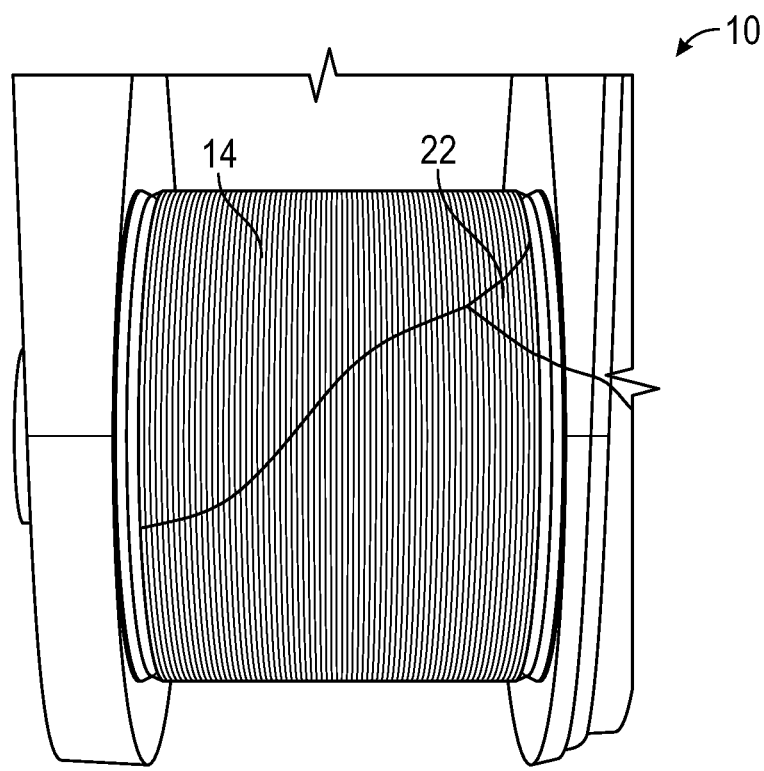
FIGS. 2A and 2B are a views of a rod journal of a crankshaft according to the principles of the present disclosure.

Referring to the drawings, wherein like reference numbers refer to like components, in FIGS. 1A, 1B and 2, a crankshaft for an internal combustion engine (ICE) is illustrated and will now be described. The crankshaft, designated with the reference number 10, is a complicated and important part of the ICE. The primary purpose of the crankshaft 10 is to transfer reciprocating motion and force to rotational motion and torque. The crankshaft 10 includes a plurality of main journals 12, rod journals 14, counterweights 16, a post 18, and a flange 20. More particularly, the main journals 12 and rod journals 14 each include surfaces 42 and a hardened case 44. The surfaces 42 of the main journals 12 and rod journals 14 are designed to oppose bearing surfaces of inserts in the engine block and connecting rod assembly, respectively (not shown). For example, the main journals 12 are rotatably supported by the main bearings of the engine block (not shown). The rod journals 14 are rotatably connected to the connecting rod bearings of the connecting rod and piston assembly (not shown). The hardened case 44 of the main journals 12 and rod journals 14 penetrate to a depth D from the surface 42 of the main journals 12 and rod journals 14. Due to the purpose and function of journal surfaces 42, the material specification for surface hardness is greater than the other features of the crankshaft 10. However, since the crankshaft 10 functions to transfer reciprocating motion to rotational motion it is also subjected to heavy torque loads and bending forces. In this regard, the majority of the crankshaft 10 is specified to a high toughness to avoid catastrophic or fatigue type failures. Thus, a crankshaft 10 having a high yield strength and toughness that is further processed to increase hardness on critical surfaces is ideal.

Figure 2B:
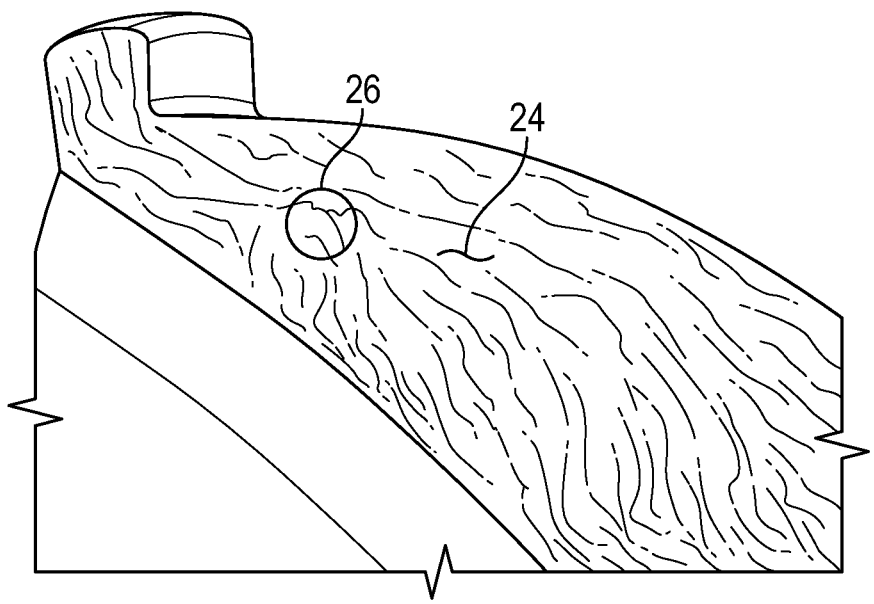

One of the challenges in manufacturing the crankshaft 10 to these specifications is that the existing process for hardening causes excessive residual stresses in the surrounding material. As can be seen in FIGS. 2A and 2B, a fatigue crack 22 has formed in the rod journal 14 of the failed crankshaft 10. FIG. 2B depicts the failure surface 24 where the crack 22 originated at an area 26 having high residual stresses that were left in the crankshaft after the existing hardening process. The crankshaft 10 also includes several drilled passages 28 formed on the interior of the crankshaft 10 to provide lubrication fluid to the journal and bearing surfaces. The passages 28 also tend to act as stress risers where many failure cracks can originate.

Figure 3:
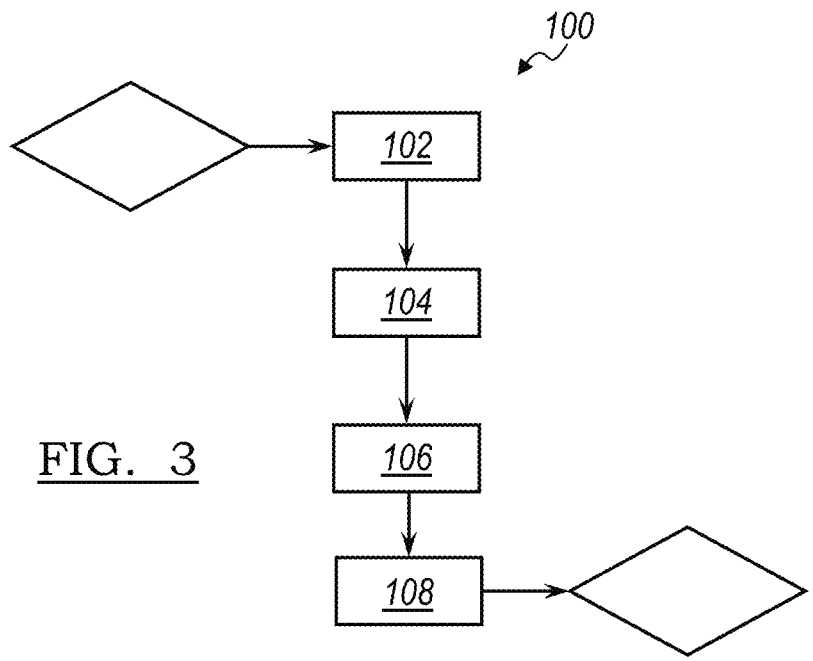
FIG. 3 is a flowchart depicting a method of hardening specified surfaces of a crankshaft according to the principles of the present disclosure.
Figure 4:
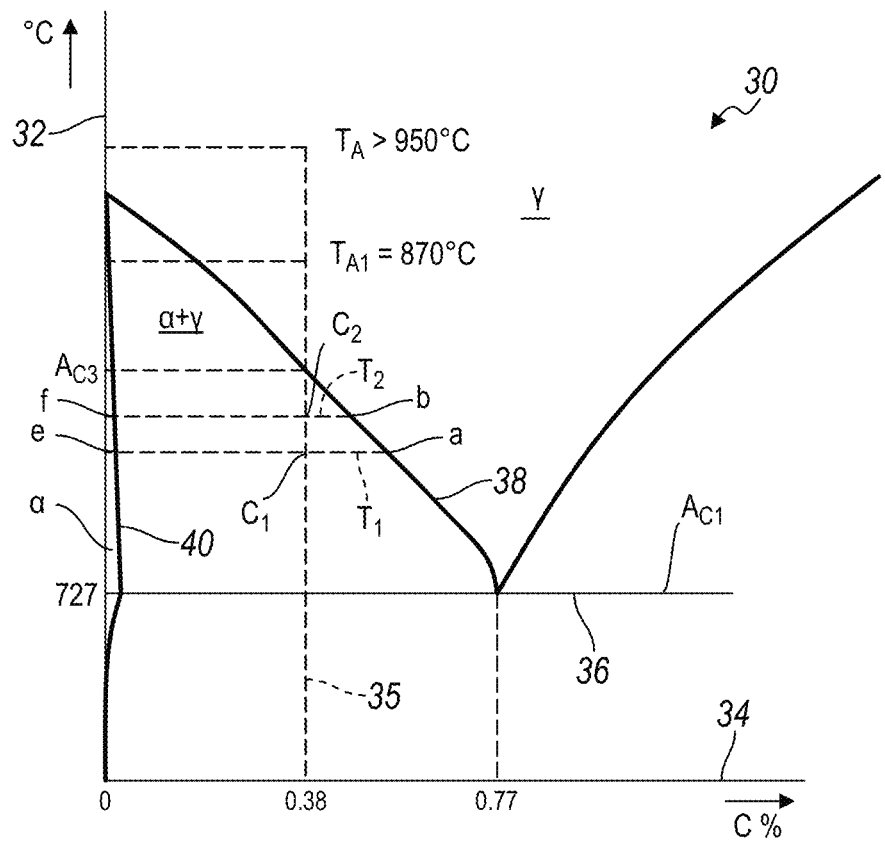
FIG. 4 is a portion of a phase diagram for an Iron-Carbon system according to the principles of the present disclosure.

Referring now to FIGS. 3 and 4, FIG. 3 is a flowchart depicting a method or hardening process for a crankshaft 10. The method, designated by reference number 100, begins with a first step 102 of providing a machined crankshaft 10. However, while the present disclosure details the method for treating a crankshaft 10, the method can be used to treat any number of steel parts requiring the mechanical properties gained by using this method without departing from the scope of this disclosure. In the example shown in FIG. 4, the crankshaft is forged from 1538MV steel. To help with the description of the method 100, the diagram of FIG. 4 is a portion of the Iron-Carbon phase diagram 30 provided for illustrative purposes. Briefly, plotted vertically 32 is the temperature in ° C. of the system or portion of matter. The plotted horizontally 34 is the carbon (C) content of the system in weight percent (wt %). The 1538MV steel comprises a carbon content of 0.38 wt % 35. Thus, beginning at 0.38 wt % C, the alloy takes the phase form as shown in the phase diagram 30. For example, with the temperature of the system under 727° C. or the eutectic temperature 36, 1538MV steel, and for that matter most steels, have the phases of ferrite α and carbide Fe$_3$C at equilibrium. As the system temperature rises above 727° C. but below A$_{c3}$ temperature at equilibrium, the phases present in the system are ferrite α and austenite γ.

A key concept employed to understand characteristics of a system is knowing the percentage of the phases at equilibrium for a particular Carbon content and temperature of the system. Using a lever rule calculation, the amount of a particular phase present at equilibrium of a particular alloy Carbon content and temperature can be found. For example, at a temperature of 780° C. of T$_1$ for 1538MV steel (C content=0.38 wt %) the following equation provides the ferrite and austenite phase percentage:

$$\text{wt \% ferrite } \alpha = \frac{a - 0.38}{a - e} * 100\% = 30\%;$$

with a=carbon content at the solidus line 38 between α+γ and γ phases at 780° C. of T$_1$ and e=carbon content at the solidus line 40 between α+γ and α phases at 780° C. of T$_1$. The balance is 70% austenite γ. Thus, comparing the fraction of austenite γ at 780° C. of T$_1$ to that of the 100% austenite γ above the critical temperature 42 of 822° C., there is a 30% reduction in the amount of austenite γ. Therefore, when the system is quenched at a cooling rate of about 15 to 20° C./sec the amount of austenite γ that is transformed to martensite is reduced by 30% with 30% undissolved ferrite α remaining. This results in a 30% reduction in residual stress occurring from the transformation of austenite γ to martensite.

In another example of the present disclosure, at a temperature of 810° C. of T$_2$ for 1538MV steel (C content=0.38 wt %) the following equation provides the ferrite and austenite phase percentage:

$$\text{wt \% ferrite } \alpha = \frac{b - 0.38}{b - f} * 100\% = 15\%;$$

with b=carbon content at the solidus line 38 between α+γ and γ phases at 810° C. T$_2$ and f=carbon content at the solidus line 40 between α+γ and α phases at 810° C. of T$_2$. The balance is 85% austenite γ. Thus, comparing the fraction of austenite γ at 810° C. of T$_2$ to that of the 100% austenite γ above the critical temperature 42 of 822° C., there is a 15% reduction in the amount of austenite γ. As a result, heating the system to between 780° C. (T$_1$) and 810° C. (T$_2$) followed by a quench at a cooling rate of about 15 to 20° C./sec provides a reduction of residual stress between 15% and 30%. Additional benefits that result from the method 100 include a reduction in thermal impact and additional undissolved ferrite α to be compressed and relieve additional residual stress caused by the transformation of austenite γ to martensite. Furthermore, since the purpose of the method is to increase surface hardness of specific portions of the crankshaft the surface hardness of the treated portion are between about HRC 42 and 53 (surface hardness of 100% martensite 1538MV is above HRC 58).

Continuing with a second step 104 of the method 100, the main journals 12 and rod journals 14 of the crankshaft 10 are heated to an intercritical temperature. The intercritical temperature is defined as a temperature between the eutectic temperature 36 of 727° C. and the temperature of the solidus line 38 between α+γ and γ phases. In this manner, not all of the heated portion would contain 100% austenite γ. In the present example, the intercritical temperature is between 780° C. (T$_1$) and 810° C. (T$_2$). Heating of the crankshaft 10 is accomplished with induction or laser heating. However, other methods of localized heating may be used without departing from the scope of the disclosure. Additionally, the temperatures used in the present example may be expanded to include temperatures between the intercritical temperatures Ac$_1$ and Ac$_3$ or just above the eutectic temperature 36 of 727° C. and just below the temperature of the solidus line 38 between α+γ and γ phases. Of course, when heating the crankshaft 10 to higher temperatures the resultant percentage of residual stress reduction is reduced due to a higher percentage of martensite. The residual stress of a fully hardened, 100% martensite is about 620 MPa as analyzed with x-ray diffraction method. The residual stress in a crankshaft 10 having 85% martensite is about 527 MPa. Similarly, the residual stress in a crankshaft 10 having 70% martensite is about 415 MPa.

Figure 5:
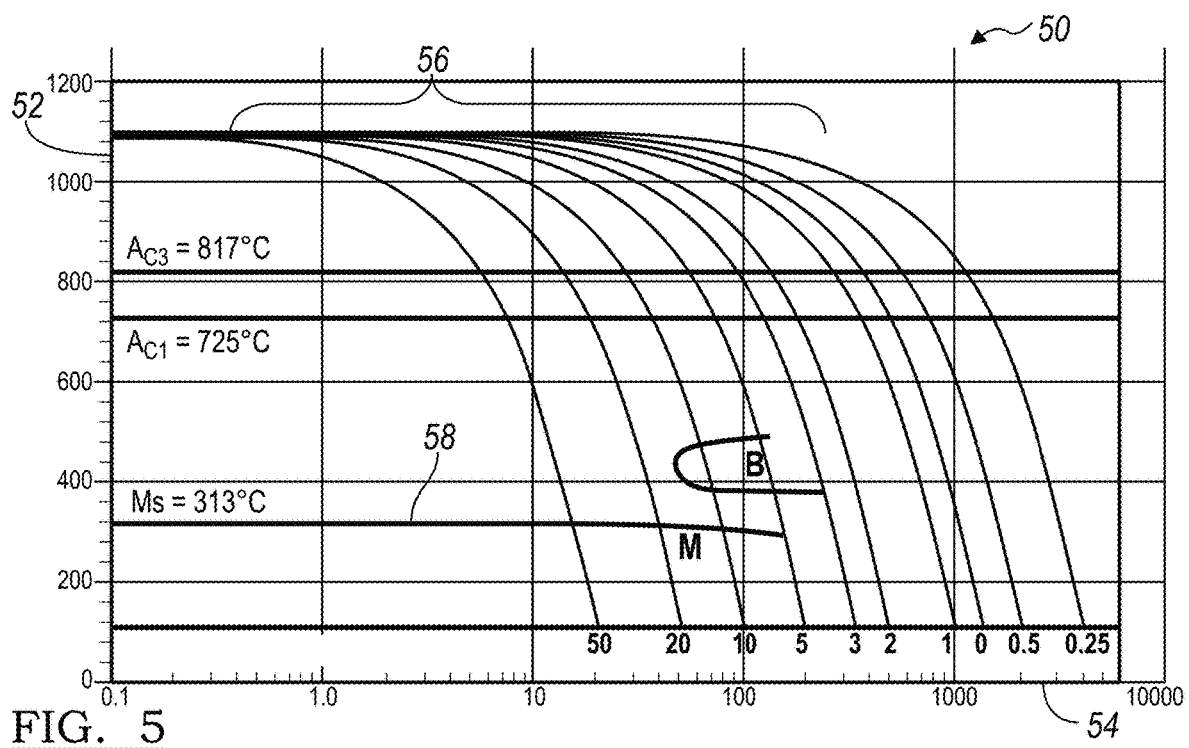
FIG. 5 is a graph depicting cooling rates of an Iron-Carbon alloy and their effect on phase transformation according to the principles of the present disclosure.
Figure 6:
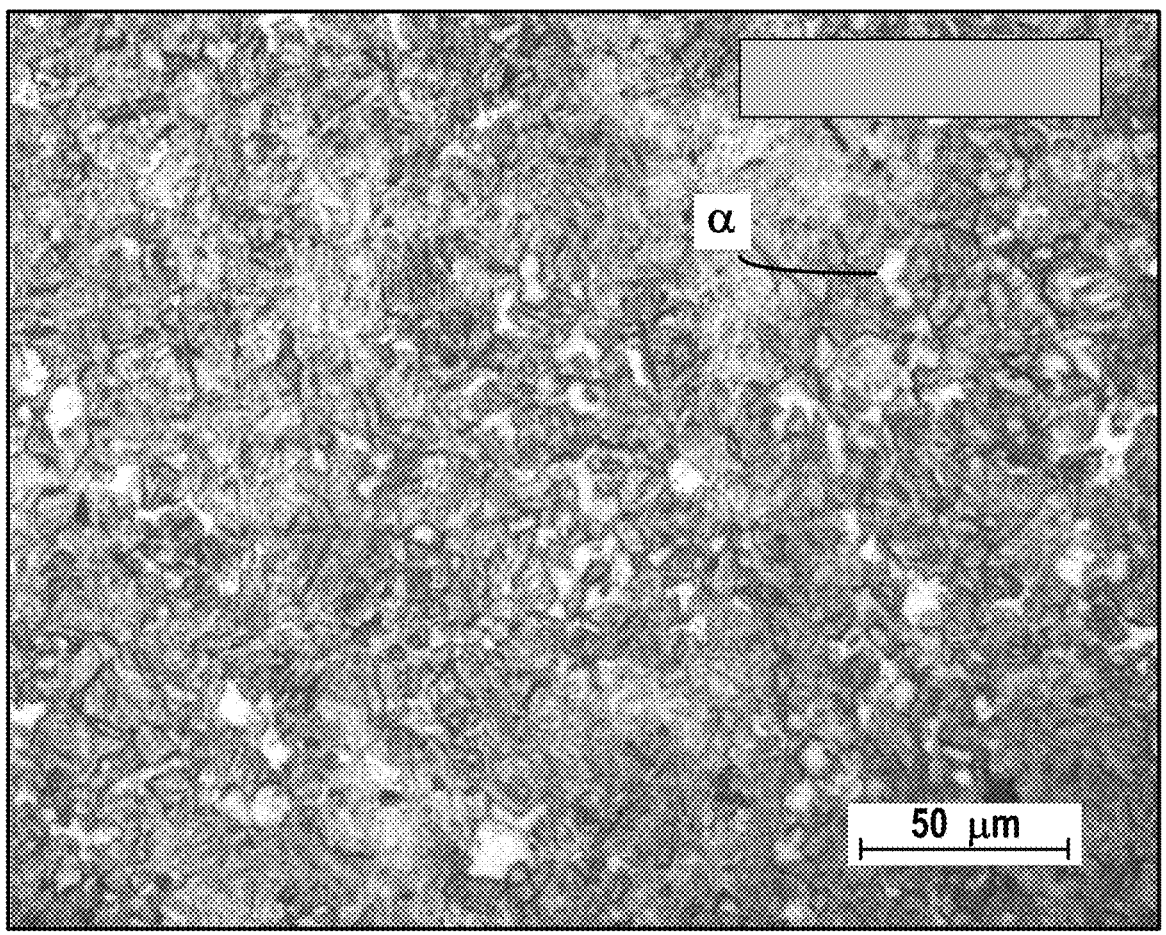
FIG. 6 is a micrograph of a sample of Iron-Carbon alloy according to the principles of the present disclosure.

A third step 106 of the method 100 includes quenching the main journals 12 and rod journals 14 of the crankshaft 10 achieving cooling rate of about 15 to 20° C./sec. The cooling rate can be achieved using an oil or polymer solution quenching medium. FIG. 5 is a graph 50 depicting the system temperature on the vertical axis 52 and quenching time on the horizontal axis 54. The lines 56 depict cooling rates with line 58 depicting the martensite start transformation temperature between about 313° C. to 326° C. FIG. 6 is a micrograph showing an example of a microstructure of the hardened case 44 of a crankshaft 10 processed through the method 100. Approximately 15% ferrite α remains in a matrix of transformed martensite. Thus after processing through the third step 106 of the method 100, the hardened case 44 has a microstructure including up to 50 wt % ferrite, and more preferably between 15 wt % and 30 wt % ferrite with the balance of martensite.

A fourth step 108 of the method includes low temperature tempering the crankshaft 10. Tempering involves heating the crankshaft to below 727° C. then cooling. After tempering, the surface hardness of the main journals 12 and rod journals 14 is between HRC 40 and 50.

While examples have been described in detail, those familiar with the art to which this disclosure relates will recognize various alternative designs and examples for practicing the disclosed method within the scope of the appended claims.

The following is claimed:

1. A method for manufacturing a ferrous workpiece, the method comprising:
   providing a machined crankshaft comprised of a steel comprising between 0.3 wt % and 0.77 wt % Carbon, and wherein the crankshaft comprises a first journal having a surface and a case;
   heating the surface of the first journal to an intercritical temperature of between about 724° C. and 760° C.; and
   quenching the surface of the first journal with a quench medium achieving a cooling rate between 15 to 20° C./sec.

2. The method for manufacturing a ferrous workpiece of claim 1 further comprises tempering the crankshaft.

3. The method for manufacturing a ferrous workpiece of claim 1 wherein quenching the surface of the first journal with the quench medium achieving the cooling rate between 15 to 20° C./sec further comprises quenching the surface of the first journal with one of an oil and a polymer.

4. The method for manufacturing a ferrous workpiece of claim 1 wherein the machined workpiece comprises a steel comprising about 0.38 wt % Carbon.

5. A method for manufacturing a ferrous workpiece, the method comprising:
   providing a machined crankshaft comprised of a steel comprising between 0.3 wt % and 0.77 wt % Carbon, and wherein the crankshaft comprises a first journal having a surface and a case;
   heating the surface of the first journal to an intercritical temperature of between about 724° C. and 822° C.; and
   quenching the surface of the first journal with a quench medium achieving a cooling rate between 15 to 20° C./sec.

6. A method for manufacturing a ferrous workpiece, the method comprising:
   providing a machined crankshaft comprised of a steel comprising between 0.3 wt % and 0.77 wt % Carbon, and wherein the crankshaft comprises a first journal having a surface and a case;
   heating the surface of the first journal to an intercritical temperature of between about 780° C. and 810° C.; and
   quenching the surface of the first journal with a quench medium achieving a cooling rate between 15 to 20° C./sec.

* * * * *